(12) United States Patent
Pan et al.

(10) Patent No.: US 9,800,054 B2
(45) Date of Patent: Oct. 24, 2017

(54) DC CONNECTION SYSTEM FOR RENEWABLE POWER GENERATORS

(71) Applicant: ABB Schweiz AG, Baden (CH)

(72) Inventors: Jiuping Pan, Raleigh, NC (US); Sandeep Bala, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 510 days.

(21) Appl. No.: 14/448,294

(22) Filed: Jul. 31, 2014

(65) Prior Publication Data

US 2016/0036221 A1    Feb. 4, 2016

(51) Int. Cl.

| | |
|---|---|
| *H02J 7/34* | (2006.01) |
| *H02J 1/10* | (2006.01) |
| *H02J 3/38* | (2006.01) |
| *H02J 3/36* | (2006.01) |
| *H02J 1/00* | (2006.01) |

(52) U.S. Cl.
CPC ............... *H02J 3/386* (2013.01); *H02J 3/36* (2013.01); *H02J 3/381* (2013.01); *H02J 2001/008* (2013.01); *Y02E 10/763* (2013.01); *Y02E 60/60* (2013.01)

(58) Field of Classification Search
CPC ... H02J 3/36; H02J 3/386; H02J 3/381; Y02E 10/763
USPC .......................................................... 307/52
See application file for complete search history.

(56) References Cited

U.S. PATENT DOCUMENTS

| | | |
|---|---|---|
| 7,324,359 B2 | 1/2008 | Schreiber |
| 8,018,083 B2 | 9/2011 | Larsen et al. |
| 8,129,853 B2 | 3/2012 | Abolhassani et al. |
| (Continued) | | |

FOREIGN PATENT DOCUMENTS

| | | |
|---|---|---|
| DE | 19620906 A1 | 1/1998 |
| DE | 102010023019 A1 | 12/2011 |
| (Continued) | | |

OTHER PUBLICATIONS

Yuan, Xibo, "Low Voltage Ride Through Control of a Cascaded High Power Converter for Direct-Drive Permanent Magnet Wind Generators", IEEE, 2012, Department of Electrical and Electronic Engineering, The University of Bristol, Brisol, UK, pp. 3553-3559.

(Continued)

*Primary Examiner* — Carlos Amaya
(74) *Attorney, Agent, or Firm* — Taft Stettinius & Hollister LLP

(57) ABSTRACT

A DC connection system for renewable power generators includes a first monopole DC collection network, a second monopole DC collection network and a first bipole transmission system. The first monopole DC collection network aggregates positive-valued DC voltage outputs of a first cluster of renewable power generators onto a positive terminal of the first monopole DC collection network. The second monopole DC collection network aggregates negative-valued DC voltage outputs of a second cluster of renewable power generators onto a negative terminal of the second monopole DC collection network. The first bipole transmission system is coupled to the positive and negative terminals of the monopole DC collection networks, for transferring the aggregated power to a power grid substation.

24 Claims, 9 Drawing Sheets

(56) References Cited

U.S. PATENT DOCUMENTS

| | | | |
|---|---|---|---|
| 8,174,138 B2 | 5/2012 | Castelli Dezza et al. | |
| 8,263,276 B1 | 9/2012 | Gurunathan et al. | |
| 8,503,202 B2 | 8/2013 | Chimento et al. | |
| 8,552,577 B2 | 10/2013 | Lu et al. | |
| 2002/0079706 A1 | 6/2002 | Rebsdorf et al. | |
| 2008/0143111 A1 | 6/2008 | Ichinose et al. | |
| 2009/0283130 A1* | 11/2009 | Gilmore | H02J 1/10 136/244 |
| 2010/0133901 A1 | 6/2010 | Zhang et al. | |
| 2011/0049994 A1 | 3/2011 | Hiller et al. | |
| 2011/0141773 A1 | 6/2011 | Larsen et al. | |
| 2012/0175962 A1* | 7/2012 | Zhan | H02J 1/102 307/82 |
| 2013/0197704 A1 | 8/2013 | Pan et al. | |
| 2013/0200714 A1 | 8/2013 | Pan et al. | |
| 2013/0322131 A1 | 12/2013 | Sun | |
| 2014/0197639 A1 | 7/2014 | Bala et al. | |

FOREIGN PATENT DOCUMENTS

| | | |
|---|---|---|
| EP | 2341594 A1 | 7/2011 |
| EP | 2408081 A1 | 1/2012 |
| WO | 0074198 A1 | 12/2000 |
| WO | 2009135728 A3 | 11/2009 |
| WO | 2011055175 A3 | 5/2011 |
| WO | 2012041380 A1 | 4/2012 |
| WO | 2012048743 A1 | 4/2012 |
| WO | 2013110327 A1 | 8/2013 |

OTHER PUBLICATIONS

Baroudi, et al., "A Review of Power Converter Topologies for Wind Generators", IEEE, 2005, Department of Electrical and Computer Engineering, University of Alberta, pp. 458-465.

Chen, et al., "DC/DC Conversion Systems Consisting of Multiple Converter Modules: Stability, Control, and Experimental Verifications", IEEE Transactions on Power Electronics, vol. 24, No. 6, Jun. 6, 2009, pp. 1463-1474.

Garcia, et al., "Modeling and Control of Squirrel Cage Induction Generator with Full Power Converter Applied to Windmills", Oulun Yliopisto, University of Oulu, Nov. 30, 2009, pp. 1-86.

Johnson, Brian K., "Current Control on a Superconducting High Voltage DC Mesh", University of Wisconsin-Madison, May 1989, pp. 1-91.

Lena, Max et al., "Energy Evaluation for DC/DC Converters in DC-Based Wind Farms", Division of Electric Power Engineering, Department of Energy and Environment, Chalmers University of Technology, Goteborg, Sweden, 2007, pp. 1-161.

Liserre, et al., "Overview of Multi-MW Wind Turbines and Wind Parks", IEEE Transactions on Industrial Electronics, vol. 58, No. 4, Apr. 4, 2011, pp. 1081-1095.

Lopatkin, et al., "High-Voltage Bi-Directional DC-DC-Converter for Advanced Electric Locomotives", Power Electronics and Applications, 2009, EPE '09, 13th European Conference, Sep. 8-10, 2009, pp. 1-10.

Lundberg, Stefan, "Evaluation of Wind Farm Layouts", Department of Electrical Power Engineering, Chalmers University of Technology, Goteborg, Sweden, pp. 1-8.

Lundberg, Stefan, "Wind Farm Configuration and Energy Efficient Studies—Series DC Versus AC layouts", Department of Energy and Environment, Chalmers University of Technology, Goteborg, Sweden 2006, ISBN 978-91-7291-884-9, pp. 1-141.

Macken, et al., "A DC Bus System for Connecting Offshore Wind Turbines with the Utility System", Katholieke Universiteit Leuven, Department of Electrical Engineering, Leuven, Belgium, pp. 1-6.

Max, et al., "Control Method and Snubber Selection for a 5 MW Wind Turbine Single Active Bridge DC/DC Converter", Chalmers University of Technology, Division of Energy and Environment, Goteborg, Sweden, pp. 1-10.

Max, Lena, "Design and Control of a DC Collection Grid for a Wind Farm", Department of Energy and Environment, Chalmers University of Technology, Goteborg, Sweden, 2009, pp. 1-167.

Meier, et al., "Benchmark of Annual Energy Production for Different Wind Farm Topologies", IEEE, 2005, Royal Institute of Technology, Electrical Machines and Power Electronics, Stockholm, Sweden, Vestas Wind Systems A/S R&D Converter Design, Hammel, Danmark, pp. 2073-2080.

Meier, et al., "New Topology for More Efficient AC/DC Converters for Future Offshore Wind Farms", Royal Institute of Technology, Stockholm, Sweden, pp. 1-6.

Meier, et al., "New Voltage Source Converter Topology for HVDC Grid Connection of Offshore Wind Farms", Proceedings of EPE-PEMC, Sep. 2004, Latvia, pp. 1-8.

Meyer, et al., "Key Components for Future Offshore DC Grids", Aachener Beitrage des ISEA, vol. 46, Sep. 2007, Institute for Power Electronics and Electrical Drives, RWTH Aachen University, pp. 1-98.

Mogstad, et al., "A Power Conversion System for Offshore Wind Parks", IEEE, Norwegian University of Science and Technology, Department of Electric Power Engineering, Trondheim, Norway, pp. 2106-2112.

Mogstad, et al., "Power Collection and Integration on the Electric Grid from Offshore Wind Parks", NORPIE, Nordic Workshop on Power and Industrial Electronics, Norweigan University of Science and Technology, Department of Electric Power Engineering, Trondheim, Norway, Jun. 9-11, 2008, pp. 1-8.

Norpie, , "4th Nordic Workshop on Power and Industrial Electronics", NTNU, Norweigan University of Science and Technology, Department of Electrical Power Engineering, Jun. 14-16, 2014, pp. 1-7.

Oates, Colin, "A Methodology for Developing 'Chainlink' Converters", Areva T&D Pes, pp. 1-10.

Pan, et al., "DC Connection for Large-Scale Wind Farms", ABB Research Corp., pp. 1-7.

Prasai, et al., "A New Architecture for Offshore Wind Farms", IEEE Transactions on Power Electronics, vol. 23, No. 3, May 2008, pp. 1198-1204.

Ranganathan, et al., "A Regulated DC-DC Voltage Source Converter Using a High Frequency Link", IEEE Transactions on Industry Applications, vol. 1A-18, No. 3, May/Jun. 1982, pp. 279-287.

Steimer, et al., "Medium Voltage Power Conversion Technology for Efficient Windpark Power Collection Grids", 2010 2nd IEEE International Symposium on Power Electronics for Distributed Generation Systems, pp. 12-18.

Takei, et al., "The Reverse Blocking IGBT for Matrix Converter with Ultra-Thin Wafer Technology", Fuji Electric Corporate Research and Development, Ltd., Japan, pp. 1-4.

Zinov'Ev, et al., "High-Voltage DC-DC Converter for New-Generation Electric Locomotives", ISSN 1068-3712, Russian Electrical Engineering, 2009, vol. 80, No. 12, Allerton Press, Inc., pp. 685-690.

\* cited by examiner

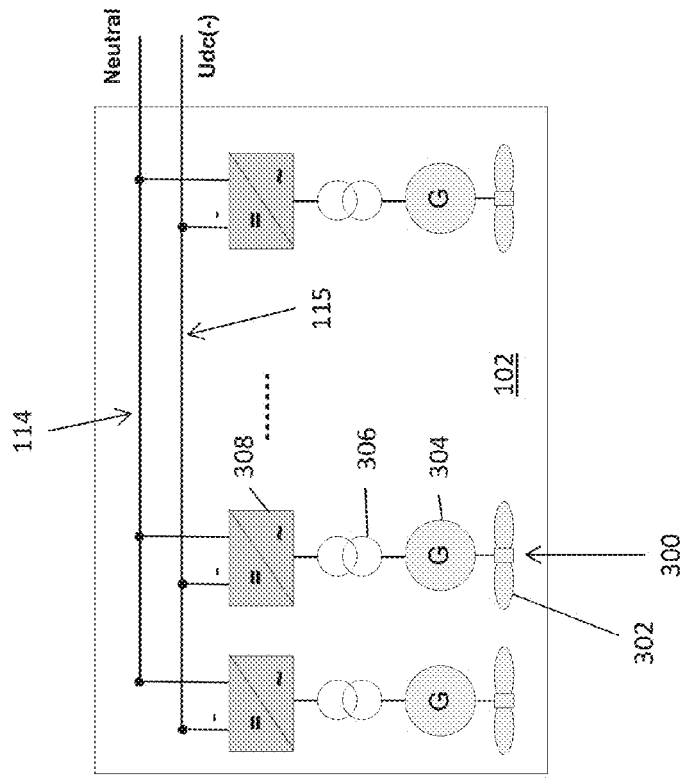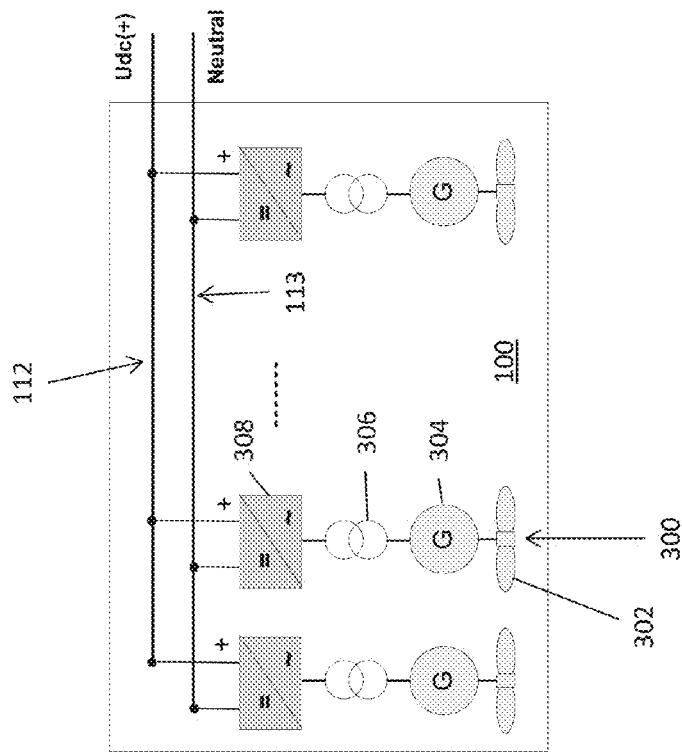
Figure 3

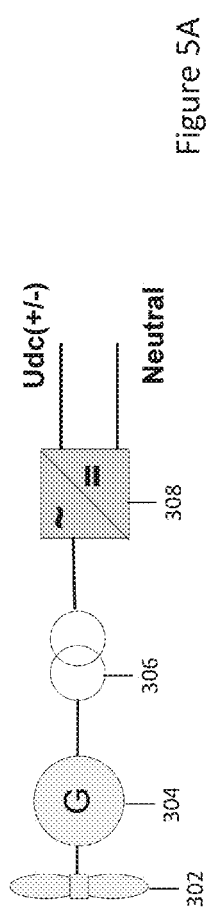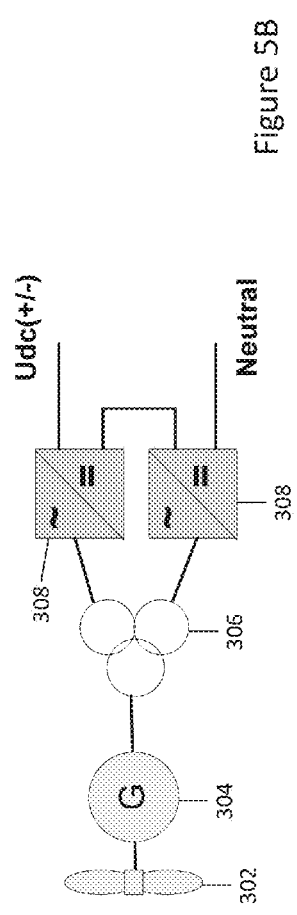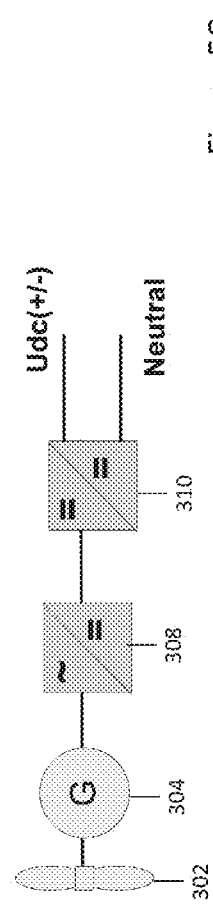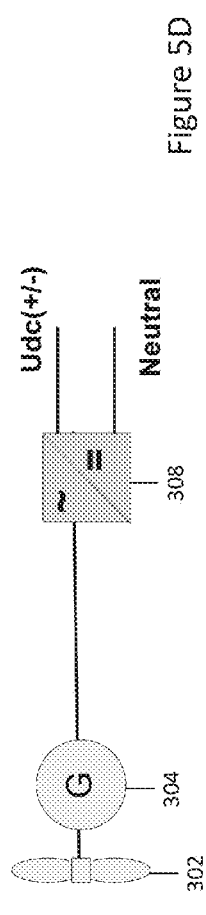

DC CONNECTION SYSTEM FOR RENEWABLE POWER GENERATORS

TECHNICAL FIELD

The instant application relates to DC connection systems, and more particularly to DC connection system for renewable power generators.

BACKGROUND

The electrical system in an offshore wind power plant (also commonly referred to as a wind farm) and its connection to the main power grid pose technical challenges with regard to overall system cost. The electrical system of a typical large-scale offshore wind power plant consists of wind turbine generators with associated converters and step-up transformers, a medium voltage collection system, an offshore substation, a high voltage transmission system, and an onshore substation to interface with the main power grid. Medium voltage alternating current (AC) collection systems, typically 33-36 kV, are currently used, irrelevant of the type of wind turbine technologies utilized by the wind farm. The choice of transmission system is mainly determined by the distance from the offshore wind power plant to the onshore grid connection point. For close-to-shore wind power plants, high voltage AC (HVAC) transmission systems are used. For offshore wind power plants with long distances to shore, voltage source converter-based high voltage DC (VSC-HVDC) systems have proven technically advantageous and cost-effective over conventional HVAC solutions. For large offshore wind farms, cost reductions can be achieved by increasing the collection grid voltage from 33-36 kV AC to 66-72 kV AC. For small and close-to-shore wind farms, it might be cost effective to connect wind turbines to onshore substations directly by 66-72 kV AC cables. An alternative solution is to use a wind turbine drivetrain that produces high enough DC voltage output and transmits the DC power directly onshore with DC cables. The use of DC cables allows for large wind farm connection and significantly longer distance transmission (compared to direct AC connections) without an offshore platform. There are both technical and cost challenges for implementing direct DC connection solutions. Technically, the DC output voltages of wind turbines are limited to certain potential levels mainly due to insulation restrictions within the wind tower. Economically, higher DC transmission voltages are desirable for optimal use of cable capacities and efficient power delivery. As such, there is a need for optimal coupling between the DC wind turbines and the DC collection and transmission system.

SUMMARY

According to an embodiment of a DC connection system for renewable power generators, the DC connection system comprises a first monopole DC collection network for aggregating positive-valued DC voltage outputs of a first cluster of renewable power generators onto a positive terminal of the first monopole DC collection network and a second monopole DC collection network for aggregating negative-valued DC voltage outputs of a second cluster of renewable power generators onto a negative terminal of the second monopole DC collection network. The DC connection system further comprises a first bipole transmission system coupled to the positive and negative terminals of the monopole DC collection networks, for transferring the aggregated power to a power grid substation.

According to an embodiment of a renewable power generation system, the renewable power generation system comprises a first cluster of renewable power generators configured to provide positive-valued DC voltage outputs, a second cluster of renewable power generators configured to provide negative-valued DC voltage outputs and a DC connection system. The DC collection system comprises a first monopole DC collection network for aggregating the positive-valued DC voltage outputs of the first cluster of renewable power generators onto a positive terminal of the first monopole DC collection network and a second monopole DC collection network for aggregating the negative-valued DC voltage outputs of the second cluster of renewable power generators onto a negative terminal of the second monopole DC collection network. The DC collection system further comprises a first bipole transmission system coupled to the positive and negative terminals of the monopole DC collection networks, for transferring the aggregated power to a power grid substation.

According to an embodiment of a method of transferring power generated by a renewable power generation system to a power grid, the method comprises: configuring a first cluster of renewable power generators to provide an aggregated positive-valued DC voltage output; configuring a second cluster of renewable power generators to provide an aggregated negative-valued DC voltage output; connecting the aggregated positive-valued DC voltage output of the first cluster of renewable power generators to a power grid substation via a first monopole DC collection network and a bipole transmission system of a DC connection system; and connecting the aggregated negative-value DC voltage output of the second cluster of renewable power generators to the power grid substation via a second monopole DC collection network and the bipole transmission system of the DC connection system.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings:

FIG. 3 illustrates a block diagram of an embodiment of positive and negative monopole DC collection networks of a DC connection system that connects clusters of renewable power generators to a power grid substation.

FIG. 5, which includes FIGS. 5A through 5D, illustrates different types of wind turbine-based generators included in clusters of renewable power generators.

FIG. 8, which includes

DETAILED DESCRIPTION

According to the embodiments described herein, a direct current (DC) connection system is provided for connecting renewable power generators to a power grid substation. The DC connection system has positive and negative monopole collection networks for connecting to different clusters of renewable power generators. Each cluster of renewable power generators provides either positive-valued or negative-valued unipolar DC output. In a monopole configuration, one terminal of each collection network is connected to earth ground and the other terminal, at a potential high above or below ground, is connected to a transmission line or cable of the DC connection system. To this end, the DC connection system also has a bipole transmission system for connecting the monopole collection networks to a power grid substation e.g. without using a power converter to connect the monopole DC collection networks to the bipole transmission system.

In one example, the DC connection system provides a DC connection scheme for integrating a plurality of wind turbines grouped into at least two wind turbine clusters. The wind turbines in the first cluster provide positive-valued DC outputs and are connected to a positive monopole DC collection network of the DC connection system. The wind turbines in the second cluster provide negative-valued DC outputs and are connected to a negative monopole dc collection network of the DC connection system. The neutral terminals of the two clusters are connected, resulting in an aggregated wind energy source with bipolar DC output. The aggregated wind energy source is interconnected to an onshore power grid substation through the bipole transmission system which comprises a positive pole cable, a negative pole cable and an optional neutral cable. Such a system allows for the direct connection (i.e. without an intermediary power converter) of the wind turbines or other renewable power generators to the main power grid, thereby eliminating the need for an offshore platform.

Figure 1:
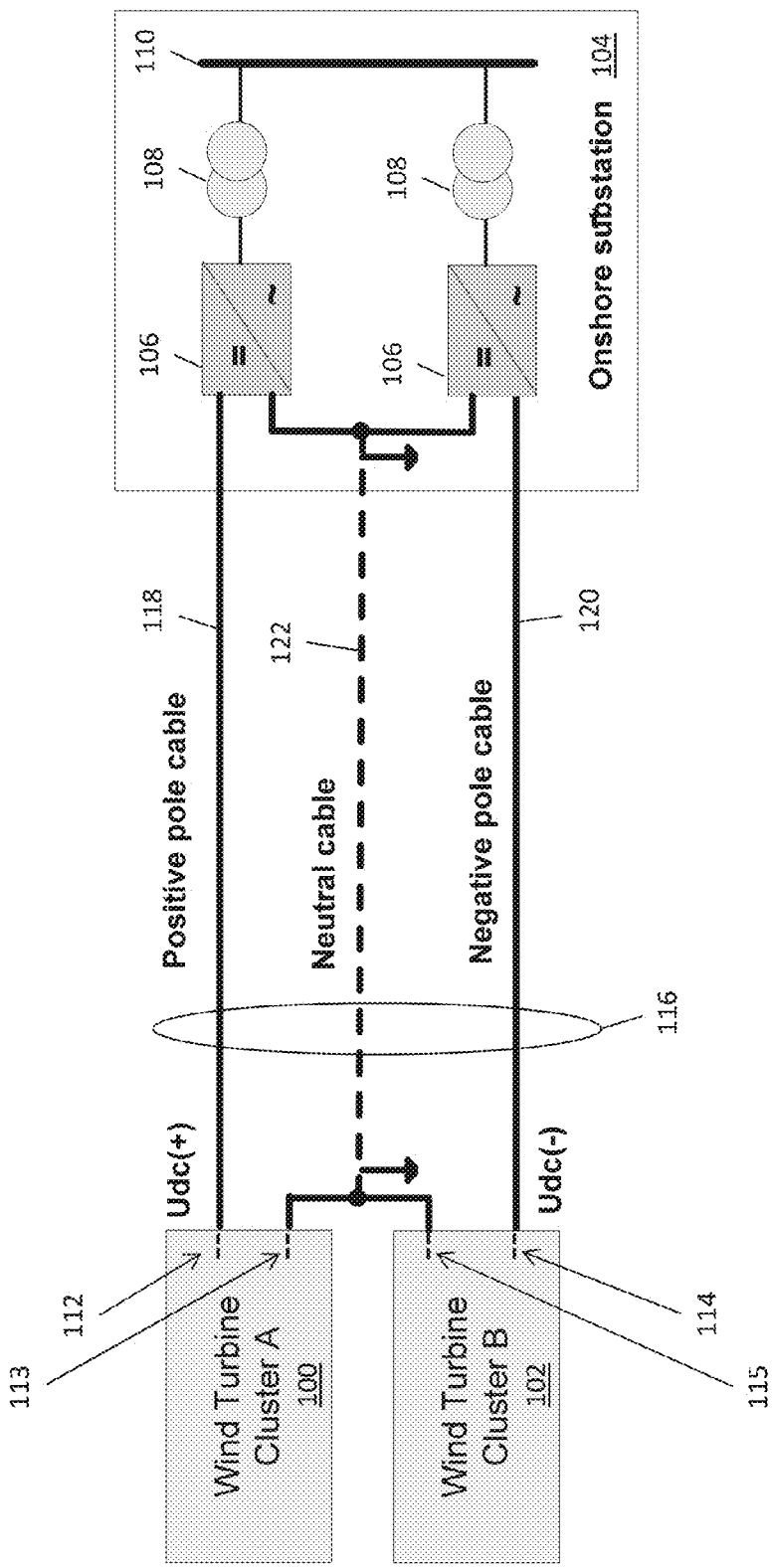
FIG. 1 illustrates a block diagram of an embodiment of a renewable power generation system that includes clusters of renewable power generators and a DC connection system for connecting the clusters to a power grid substation.

FIG. 1 illustrates an embodiment of a renewable power generation system that includes a first cluster 100 of renewable power generators configured to provide positive-valued DC voltage outputs, a second cluster 102 of renewable power generators configured to provide negative-valued DC voltage outputs and a DC connection system for connecting the clusters 100, 102 of renewable power generators to a power grid substation 104 which can include converters 106, transformers 108, buses 110, etc. In one embodiment, the renewable power generators are wind turbines as indicated in FIG. 1. Other types of renewable power generators such as solar, geothermal, water, tidal, etc. can be included in the clusters 100, 102 instead of or in addition to wind turbines.

In each case, the DC connection system includes a positive monopole DC collection network 112, a negative monopole DC collection network 114 and a bipole transmission system 116. The positive monopole DC collection network 112 aggregates the positive-valued DC voltage outputs of the first cluster 100 of renewable power generators onto a positive terminal Udc(+) of the positive monopole DC collection network 112. The negative monopole DC collection network 114 aggregates the negative-valued DC voltage outputs of the second cluster 102 of renewable power generators onto a negative terminal Udc(−) of the negative monopole DC collection network 114. The neutral terminals of the renewable power generators included in each cluster 100, 102 are connected by a neutral cable 113, 115 of the corresponding monopole DC collection network 112, 114.

Several cable options can be used to implement each monopole DC collection network 112, 114. For example, each monopole DC collection network 112, 114 can include one DC cable with a rated voltage, either positive-valued or negative-valued, and a neutral cable rated for only a few kilovolts. In another example, each monopole DC collection network 112, 114 can include one coaxial structured DC cable having an inner conductor with a rated voltage either positive-valued or negative-valued, and an outer return conductor for only a few kilovolts. Still other cable implementations can be used for the positive and negative monopole DC collection networks 112, 114 of the DC connection system.

The bipole transmission system 116 of the DC connection system can be considered a 'virtual' bipole transmission system in that it is coupled to the positive and negative terminals Udc(+), Udc(−) of the monopole DC collection networks 112, 114. The bipole transmission system 116 is coupled to the positive and negative terminals Udc(+), Udc(−) of the monopole DC collection networks 112, 114 e.g. without using a power converter. For example, the connection can be made through switchgear (not shown) but not through a power converter. The monopole DC collection networks 112, 114 can transfer power at the same or different voltage as described in more detail later herein. In each case, the bipole transmission system 116 transfers the aggregated power to the power grid substation 104 at substantially the same voltage as the positive and negative monopole DC collection networks 112, 114 in this example i.e. no power converter in the bipole transmission system 116.

Several cable options can be used to implement the bipole transmission system 116. In one example, the bipole transmission system 116 includes two separate DC cables with rated voltage, one positive-valued and one negative-valued, and a neutral cable rated for only a few kilovolts. In another example, the bipole transmission system 116 includes two separate DC cables with rated voltage, one positive-valued and one negative-valued, without a neutral cable for the installations where ground return currents are allowed. In yet another example, the bipole transmission system 116 includes a single DC cable with three conductors, one positive pole conductor, one negative pole conductor and one neutral conductor. Still other cable implementations can be used for the bipole transmission system 116 of the DC connection system.

The neutral terminals of the renewable generators in each cluster 100, 102 are connected, resulting in an aggregated wind energy source with bipolar DC output. The DC connection system transfers the aggregated power to the power grid substation 104 which provides an interface with the main power grid. For example in the case of an offshore wind farm, the aggregated wind energy source is interconnected to an onshore converter station 104 through the bipole transmission system 116 which comprises a positive pole cable or line 118, a negative pole cable or line 120 and an optional neutral cable or line 122 (also commonly referred to as metallic return cable). The neutral cable 122 connects the neutral terminals Udc(+), Udc(−) of the monopole DC collection networks 112, 114 to the power grid substation 104. This way, the positive monopole DC collection network 112 and the negative monopole DC collection network 114 can operate independently of one another if the neutral cable 122 is in service.

Figure 2:
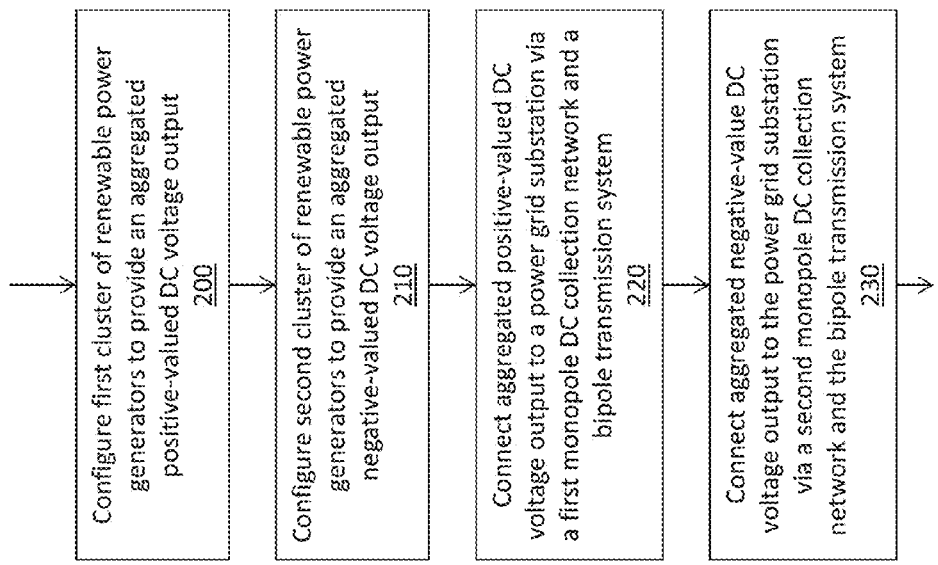
FIG. 2 illustrates a flow diagram of an embodiment of a method of transferring power generated by a renewable power generation system to a power grid.

FIG. 2 illustrates an embodiment of a method of transferring power generated by the renewable power generation system to a power grid. The method includes configuring the first cluster 100 of renewable power generators to provide an aggregated positive-valued DC voltage output (Block 200), configuring the second cluster 102 of renewable power generators to provide an aggregated negative-valued DC voltage output (Block 210), connecting the aggregated positive-valued DC voltage output of the first cluster 100 to the power grid substation 104 via the positive monopole DC collection network 112 and the bipole transmission system 116 of the DC connection system (Block 220), and connecting the aggregated negative-value DC voltage output of the second cluster 102 of renewable power generators to the power grid substation 104 via the negative second monopole DC collection network 114 and the bipole transmission system 116 of the DC connection system (Block 230).

In one embodiment, the positive monopole DC collection network 112 collects the power produced by the first cluster 100 of renewable power generators at a voltage range from about +20 kV to about +100 kV referenced to ground potential. The negative monopole DC collection network 114 collects power produced by the second cluster 102 of renewable power generators at a voltage range from about −20 kV to about −100 kV referenced to ground potential. The positive and negative monopole DC collection networks 112, 114 can collect power at substantially the same voltage range. Alternatively, the positive monopole DC collection network 112 collects power produced by the first cluster 100 of renewable power generators at different voltage range from which the negative monopole DC collection network 114 collects power produced by the second cluster 102 of renewable power generators. In either case, the bipole transmission system 116 transfers the aggregated power to the power grid substation 104 at a positive voltage between about +20 kV to about +100 kV referenced to ground potential and at a negative voltage between about −20 kV to about −100 kV referenced to ground potential according to an embodiment. The level of the positive DC voltage aggregated onto the positive terminal Udc(+) of the positive monopole DC collection network 112 and the level of the negative DC voltage aggregated onto the negative terminal Udc(−) of the negative monopole DC collection network 114 depends on the coupling configuration within the respective clusters 100, 102 of renewable power generators.

FIG. 3 illustrates one configuration embodiment for the positive and negative DC collection networks 112, 114 of the DC connection system. According to this embodiment, the positive monopole DC collection network 112 aggregates the positive-valued (+) DC voltage outputs of the first cluster 100 of renewable power generators onto the positive terminal Udc(+) of the positive monopole DC collection network 112. The negative monopole DC collection network 114 similarly aggregates the negative-valued (−) DC voltage outputs of the second cluster 102 of renewable power generators onto the negative terminal Udc(−) of the negative monopole DC collection network 114. For illustrative purposes only, the renewable power generators are shown as wind turbines 300 each of which includes a rotor 302 for extracting energy from a fluid flow and converting the extracted energy into mechanical energy, an electric generator (G) 304 for converting the mechanical energy into AC electrical energy, a step-up transformer 306 for transferring the AC electrical energy at a lower voltage to a higher voltage, and a converter 308 for converting the AC electrical energy at the higher voltage to DC electrical energy. As explained previously herein, other types of renewable power generators can be used such as solar, geothermal, water, tidal, etc.

In each case, the neutral terminals of each cluster 100, 102 are connected by the respective neutral cable 113, 115 of the corresponding monopole DC collection network 112, 114. The renewable power generators in the first cluster 100 provide positive-valued DC outputs and the renewable power generators 102 in the second cluster provide negative-valued DC outputs. In the first cluster 100, the renewable power generators producing positive-value DC outputs are connected in parallel to the positive monopole DC collection network 112. In the second cluster 102, the renewable power generators producing negative-value DC outputs are connected in parallel to the negative monopole dc collection network 114.

Figure 4:
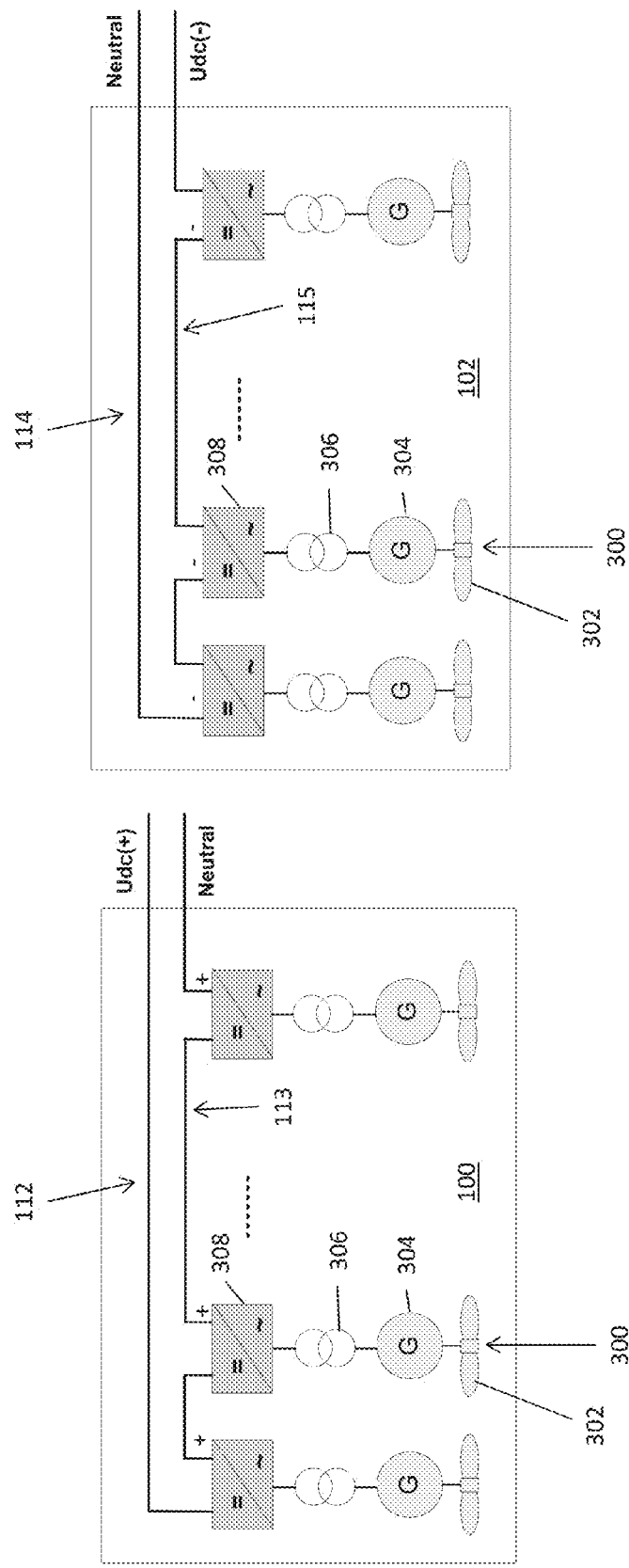
FIG. 4 illustrates a block diagram of another embodiment of positive and negative monopole DC collection networks of a DC connection system that connects clusters of renewable power generators to a power grid substation.

FIG. 4 illustrates another configuration embodiment for the positive and negative DC collection networks 112, 114 of the DC connection system. The embodiment shown in FIG. 4 is similar to the embodiment shown in FIG. 3. However, the renewable power generators producing positive-value (+) DC outputs are connected in series to the positive monopole DC collection network 112 and the renewable power generators producing negative-value (−) DC outputs are connected in series to the negative monopole dc collection network 114. In general, any series/parallel connection configuration for the renewable power generators can be utilized in order to realize the desired DC output voltage and current ranges.

In the case of wind farms and in order to enable platformless DC connection, each wind turbine 300 preferably generates a high enough DC output as technically and economically practicable. One preferred implementation of a wind turbine-based generation system, e.g. as shown in FIGS. 3 and 4, comprises a turbine 302, an electric generator 304, a step-up transformer 306, and a converter 308 as previously described herein.

FIG. 5, which includes FIGS. 5A through 5D, shows alternative wind turbine-based generation systems with unipolar DC output. In FIG. 5A, the wind turbine-based generation system includes a wind turbine generator 304 with low or medium voltage variable frequency output, a two-winding transformer 306 to increase the voltage and a converter/rectifier 308 to convert the variable frequency output into unipolar DC output. In FIG. 5B, the wind turbine-based generation system includes a wind turbine generator 304 with low or medium voltage variable frequency output, a three-winding transformer 306 to increase the voltage and two series connected converters/rectifiers 308 to convert the variable frequency output into unipolar DC output. In FIG. 5C, the wind turbine-based generation system includes a wind turbine generator 304 with low or medium voltage variable frequency output, a converter/rectifier 308 to convert the variable frequency output into unipolar DC output and a DC/DC converter 310 to increase the DC output voltage. In FIG. 5D, the wind turbine-based generation system includes a wind turbine generator 304 with higher voltage variable frequency output and a converter/rectifier 308 to converter the variable frequency output into unipolar DC output. Still other types of wind turbine-based generation systems with unipolar DC output can be coupled to the DC collection system via the positive and negative monopole DC collection networks.

The basic configuration of the DC connection system shown in FIG. 1 can be extended and modified depending on overall system design optimization considerations.

Figure 6:
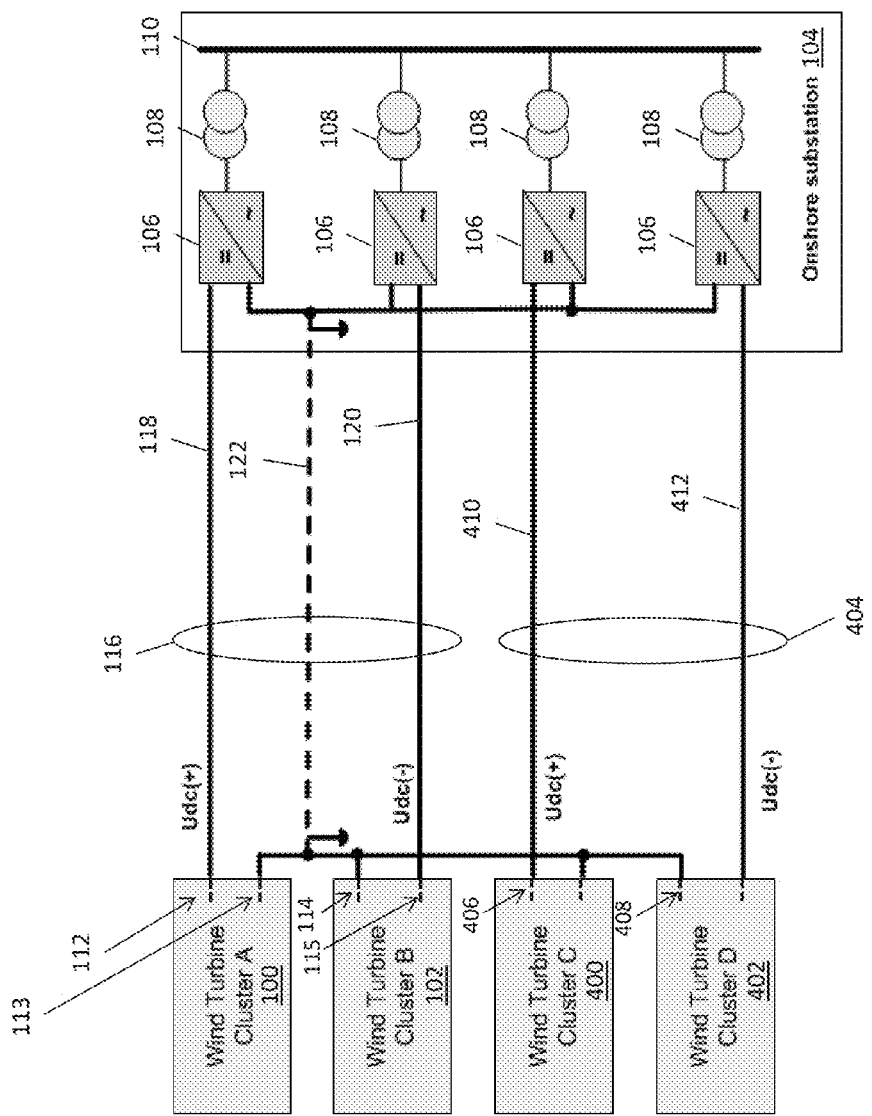
FIG. 6 illustrates a block diagram of another embodiment of a renewable power generation system that includes clusters of renewable power generators and a DC connection system that connects the clusters to a power grid substation.

FIG. 6 illustrates one embodiment where the renewable power generators e.g. in an offshore wind farm are grouped into four clusters 100, 102, 400, 402 and connected to the main power grid using two parallel bipole transmission systems 116, 404. According to this embodiment, the DC connection system further includes an additional positive monopole DC collection network 406 for aggregating positive-valued DC voltage outputs of a third cluster 400 of renewable power generators onto a positive terminal Udc(+) of an additional positive monopole DC collection network 406. The DC connection system also includes an additional negative monopole DC collection network 408 for aggregating negative-valued DC voltage outputs of a fourth cluster 402 of renewable power generators onto a negative terminal Udc(−) of the additional negative monopole DC collection network 408. The neutral terminals of all four clusters 100, 102, 400, 402 are connected, resulting in an aggregated wind energy source with bipolar DC output as previously described herein. The DC connection system includes a second bipole transmission system 404 coupled to the positive and negative terminals of the additional monopole DC collection networks 406, 408 e.g. without using a power converter. The second bipole transmission system 404 comprises a positive pole cable or line 410 and a negative pole cable or line 412. The neutral connections can be aggregated onto the neutral cable 122 of the first bipole transmission system 116. The bipole transmission systems 116, 404 transfer the aggregated power to the power grid substation 104.

Figure 7:
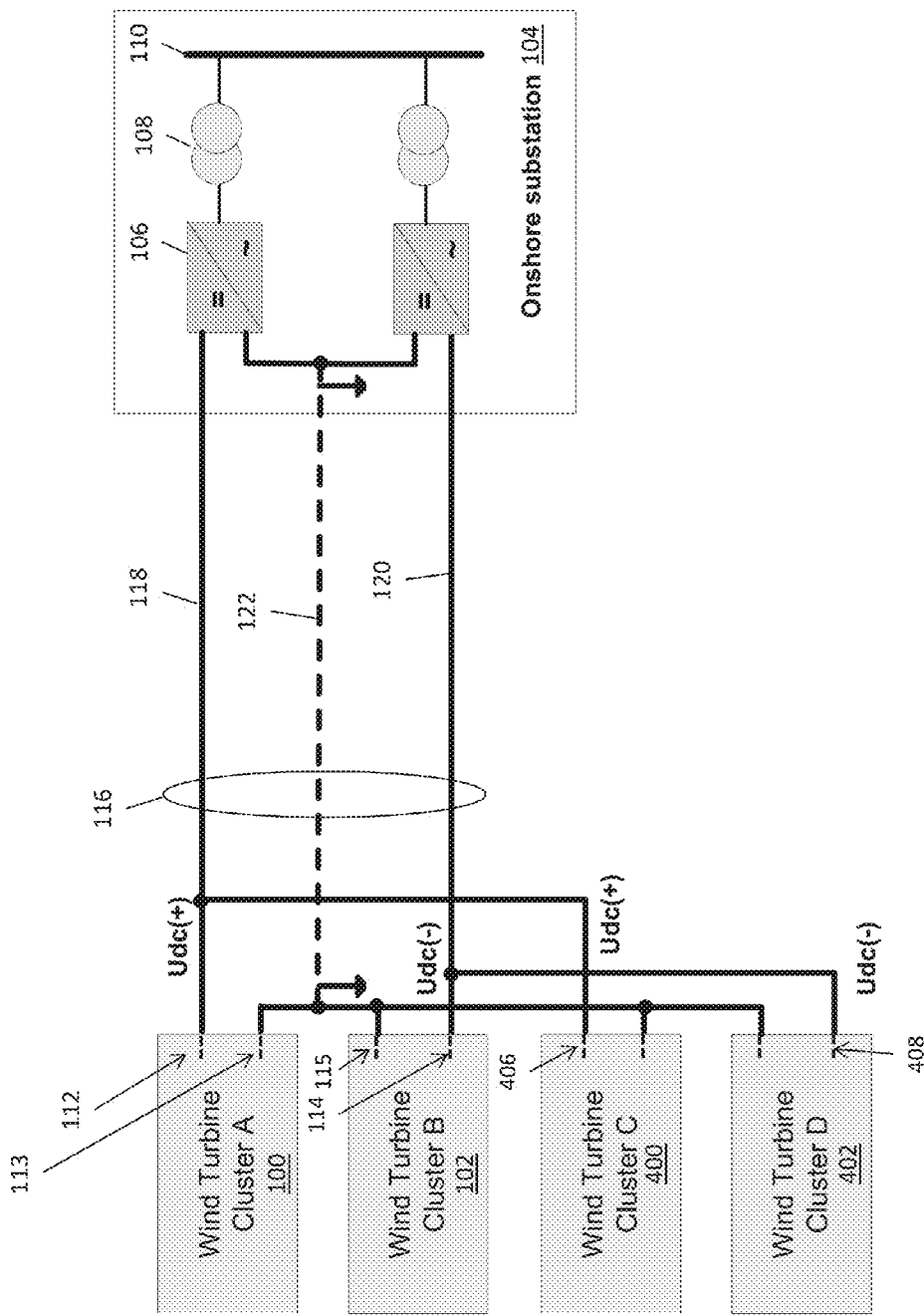
FIG. 7 illustrates a block diagram of yet another embodiment of a renewable power generation system that includes clusters of renewable power generators and a DC connection system that connects the clusters to a power grid substation.

FIG. 7 illustrates another embodiment where the renewable power generators e.g. in an offshore wind farm are grouped into four clusters 100, 102, 400, 402 and connected to the main power grid using a single bipole transmission system 116. Similar to the embodiment of FIG. 6, an additional positive monopole DC collection network 406 aggregates positive-valued DC voltage outputs of a third cluster 400 of renewable power generators onto a positive terminal Udc(+) of the additional positive monopole DC collection network 406. An additional negative monopole DC collection network 408 aggregates negative-valued DC voltage outputs of a fourth cluster 402 of renewable power generators onto a negative terminal Udc(−) of the additional negative monopole DC collection network 408. The neutral terminals of all four clusters are connected resulting in an aggregated wind energy source with bipolar DC output. Different from the embodiment of FIG. 6, the DC collection system does not include a second bipole transmission system. Instead a single bipole transmission system 116 is coupled to the positive and negative terminals of the additional monopole DC collection networks e.g. without using a power converter, for transferring the aggregated power to the power grid substation 104.

The DC connection system connecting the aggregated renewable energy source with bipolar DC output to a power grid substation 104 comprises at least two DC cables, a positive pole cable 118 and a negative pole cable 120. A third neutral cable 122 can be optionally provided for such a virtual bipole connection system. The power outputs of the clusters 100, 102, 400, 402 of renewable power generators are not equal most of the time even under normal operating conditions, and the ground return currents may be strictly restrained for many installations.

Figure 8A:
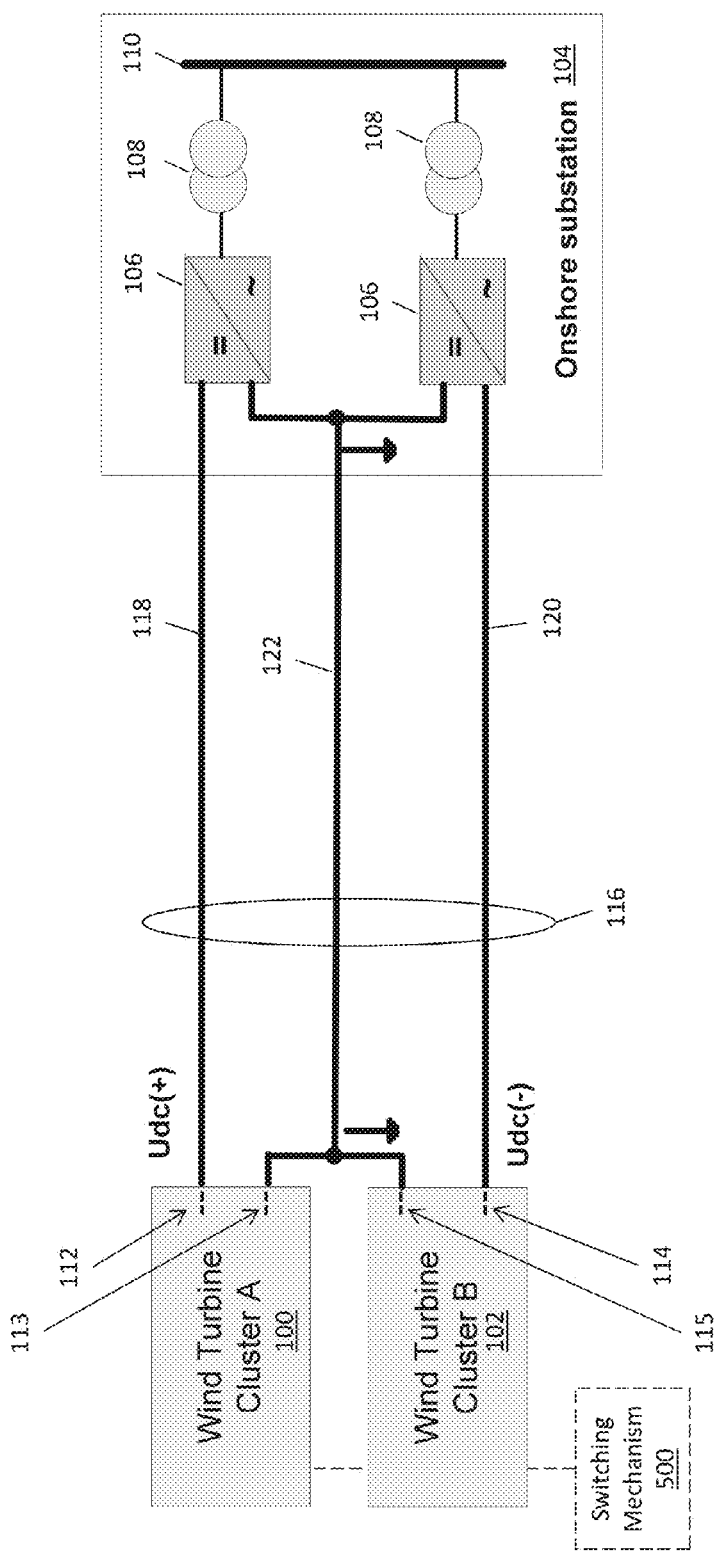
FIGS. 8A and 8B, illustrates a block diagram of an embodiment of a DC connection system for connecting clusters of renewable power generators to a power grid substation with and without a neutral cable in service.

FIG. 8A shows the DC collection system of FIG. 1 with the neutral cable 122 in service, where the neutral terminals of the clusters 100, 102 of renewable power generators are connected to the power grid substation 104 via the respective neutral cable 113, 115 of the corresponding monopole DC collection network 112, 114 and the neutral cable 122 of the bipole transmission system 116. Monopole operation of the DC connection system is possible under certain component outages or scheduled maintenance with the neutral cable 122 in service. For example, the positive monopole operation mode allows the renewable power generators in the positive pole cluster 100 to power the power grid substation 104 during an outage of a major negative pole component such as the negative pole transmission cable, negative pole collection network, negative pole converter at the power grid substation, or a combined outage of several negative pole components. As such, the operation of the positive monopole network 112 and the negative monopole network 114 are independent of each other with the neutral cable 122 in service. Although the positive and negative monopole networks 112, 114 are nominally rated for the same voltage, at a given instant they may operate at different voltage levels.

In the event of an outage of a major negative pole component(s), power transfer is permitted from the cluster 100 of renewable power generators that provides positive-valued DC voltage outputs to the power grid 104 via the positive pole transmission cable 118 of the bipole transmission system 116 even though power is not flowing from the second cluster 102 of renewable power generators to the power grid 104 via the negative pole transmission cable 120 of the bipole transmission system 116. In the event of an outage of a major positive pole component(s), power transfer is permitted from the cluster 102 of renewable power generators that provides negative-valued DC voltage outputs to the power grid 104 via the negative pole transmission cable 120 even though power is not flowing from the first cluster 100 of renewable power generators to the power grid 104 via the positive pole transmission cable 118. The monopole operation described above is feasible with the neutral cable 122 in service.

A remotely-controlled switching mechanism 500 associated with the connection of the neutral terminals of the positive pole and the negative pole clusters 100, 102 and the terminals of the neutral cable 122 can be provided. The remotely-controlled switching mechanism 500 reconfigures the connection circuits and grounding scheme based on system operation requirements, maintenance and repairing needs, including connecting or disconnecting the neutral transmission cable 122 from the system, connecting or disconnecting one cluster neutral cable 113/115 from the system, and connecting or disconnecting the groundings of the neutral transmission cable 122 and the groundings of cluster neutral cables 113, 115.

Figure 8B:
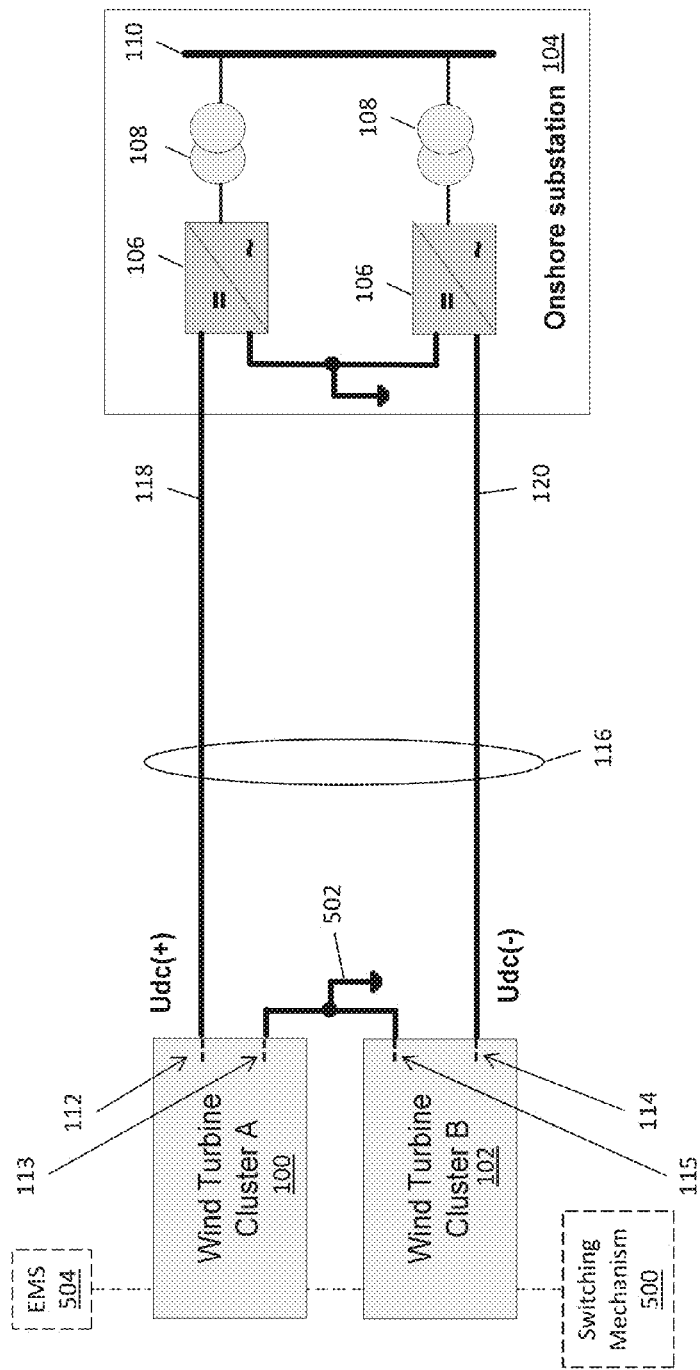

FIG. 8B shows the DC collection system with the neutral cable 122 out of service e.g. responsive to action taken by the remotely-controlled switching mechanism 500. The DC connection system can still operate with the neutral cable 122 out of service, by planning for scheduled maintenance or due to possible failure of the neutral cable 122. In the event of an outage of the neutral cable 122, the cluster 100/102 of renewable power generators that is generating the most power may be required to reduce its power output so that the amount of current flowing through the grounded connection 502 of the bipole transmission system 116 is limited during the neutral cable outage. In one embodiment, a real-time dispatch function is implemented e.g. in a plant energy management system (EMS). The real-time dispatch function balances the power outputs from the two clusters 100, 102 of renewable power generators, thus controlling the ground return currents within the allowed levels. In the case of wind turbines, standard real-time wind speed prediction can be used to estimate with reasonable accuracy the look-ahead power output of the wind turbine clusters 100, 102. The real-time dispatch function then reduces the power output from the wind turbine cluster 100/102 that produces more power than the other cluster 102/100. The real-time dispatch function needs only to be activated when the neutral cable 122 is out of service. If the rated power outputs of the operating wind turbines are equal or close, the unbalanced power outputs of the two clusters 100, 102 should be insignificant under most operating conditions. The unbalanced power outputs only become significant under certain conditions as a combination of wind speeds and directions. In such situations, the real-time dispatch function reduces the power output from selected wind turbines and can even turn-off one or more wind turbines in the cluster 100/102 that produces more power than the other cluster 102/100.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A DC connection system for renewable power generators, comprising:
    a first monopole DC collection network for aggregating positive-valued DC voltage outputs of a first cluster of renewable power generators onto a positive terminal of the first monopole DC collection network;
    a second monopole DC collection network for aggregating negative-valued DC voltage outputs of a second cluster of renewable power generators onto a negative terminal of the second monopole DC collection network; and
    a first bipole transmission system comprising a cable system coupled to the positive and negative terminals of the monopole DC collection networks for transferring the aggregated power to a power grid substation, a positive pole transmission cable of the cable system coupled to the positive terminal of the first monopole DC collection network and a first converter of the power grid substation, a negative pole transmission cable of the cable system coupled to the negative terminal of the second monopole DC collection network and a second converter of the power grid substation, the first converter being independent of the second converter.

2. The DC connection system of claim 1, wherein the cable system of the first bipole transmission system further comprises a neutral cable for connecting neutral terminals of the first and the second monopole DC collection networks to the first and second converters of the power grid substation.

3. The DC connection system of claim 2, wherein the first monopole DC collection network and the second monopole DC collection network are configured to operate independently of one another if the neutral cable is in service.

4. The DC connection system of claim 1, wherein the first monopole DC collection network is configured to collect power produced by the first cluster of renewable power generators at a voltage range from about +20 kV to about +100 kV referenced to ground potential, and wherein the second monopole DC collection network is configured to collect power produced by the second cluster of renewable power generators at a voltage range from about −20 kV to about −100 kV referenced to ground potential.

5. The DC connection system of claim 1, wherein the first bipole transmission system is configured to transfer power to the power grid substation at a positive voltage between about +20 kV to about +100 kV referenced to ground potential and at a negative voltage between about −20 kV to about −100 kV referenced to ground potential.

6. The DC connection system of claim 1, wherein the first monopole DC collection network is configured to collect power produced by the first cluster of renewable power generators at a different voltage range from which the second monopole DC collection network collects power produced by the second cluster of renewable power generators.

7. The DC connection system of claim 1, further comprising:
    a third monopole DC collection network for aggregating positive-valued DC voltage outputs of a third cluster of renewable power generators onto a positive terminal of the third monopole DC collection network;
    a fourth monopole DC collection network for aggregating negative-valued DC voltage outputs of a fourth cluster of renewable power generators onto a negative terminal of the fourth monopole DC collection network; and
    a second bipole transmission system coupled to the positive and negative terminals of the third and fourth monopole DC collection networks, for transferring the aggregated power to the power grid substation.

8. The DC connection system of claim 1, further comprising:
    a third monopole DC collection network for aggregating positive-valued DC voltage outputs of a third cluster of renewable power generators onto a positive terminal of the third monopole DC collection network; and
    a fourth monopole DC collection network for aggregating negative-valued DC voltage outputs of a fourth cluster of renewable power generators onto a negative terminal of the fourth monopole DC collection network,
    wherein the first bipole transmission system is coupled to the positive and negative terminals of the third and fourth monopole DC collection networks.

9. The DC connection system of claim 1, wherein the positive terminal of the first monopole DC collection network is connected to positive-valued DC output terminals of the renewable power generators included in the first cluster, and wherein the negative terminal of the second monopole DC collection network is connected to negative-valued DC output terminals of the renewable power generators included in the second cluster.

10. The DC connection system of claim 1, wherein the cable system of the first bipole transmission system is coupled to the positive terminal of the first monopole DC collection network and to the negative terminal of the second monopole DC collection network without using a power converter.

11. The DC connection system of claim 1, wherein the first bipole transmission system transfers the aggregated power to the power grid substation at substantially the same voltage as the first and second monopole DC collection networks.

12. A renewable power generation system, comprising:
a first cluster of renewable power generators configured to provide positive-valued DC voltage outputs;
a second cluster of renewable power generators configured to provide negative-valued DC voltage outputs; and
a DC connection system comprising:
a first monopole DC collection network for aggregating the positive-valued DC voltage outputs of the first cluster of renewable power generators onto a positive terminal of the first monopole DC collection network;
a second monopole DC collection network for aggregating the negative-valued DC voltage outputs of the second cluster of renewable power generators onto a negative terminal of the second monopole DC collection network; and
a first bipole transmission system comprising a cable system coupled to the positive and negative terminals of the monopole DC collection networks for transferring the aggregated power to a power grid substation, a positive pole transmission cable of the cable system coupled to the positive terminal of the first monopole DC collection network and a first converter of the power grid substation, a negative pole transmission cable of the cable system coupled to the negative terminal of the second monopole DC collection network and a second converter of the power grid substation, the first converter being independent of the second converter.

13. The renewable power generation system of claim 12, wherein the first and the second clusters of renewable power generators and the monopole DC collection networks are part of an off-shore wind farm, wherein the power grid substation is an on-shore power grid substation, and wherein the cable system of the first bipole transmission system connects the wind farm to the on-shore power grid substation.

14. The renewable power generation system of claim 12, wherein the cable system of the first bipole transmission system further comprises a neutral cable for connecting neutral terminals of the first and the second monopole DC collection networks to the first and second converters of the power grid substation.

15. The renewable power generation system of claim 14, wherein the first monopole DC collection network and the second monopole DC collection network are configured to operate independently of one another if the neutral cable is in service.

16. The renewable power generation system of claim 12, further comprising:
a third cluster of renewable power generators configured to provide positive-valued DC voltage outputs; and
a fourth cluster of renewable power generators configured to provide negative-valued DC voltage outputs,
wherein the DC connection system further comprises:
a third monopole DC collection network for aggregating the positive-valued DC voltage outputs of the third cluster of renewable power generators onto a positive terminal of the third monopole DC collection network;
a fourth monopole DC collection network for aggregating the negative-valued DC voltage outputs of the fourth cluster of renewable power generators onto a negative terminal of the fourth monopole DC collection network; and
a second bipole transmission system coupled to the positive and negative terminals of the third and fourth monopole DC collection networks, for transferring the aggregated power to the power grid substation.

17. The renewable power generation system of claim 12, further comprising:
a third cluster of renewable power generators configured to provide positive-valued DC voltage outputs; and
a fourth cluster of renewable power generators configured to provide negative-valued DC voltage outputs,
wherein the DC connection system further comprises:
a third monopole DC collection network for aggregating the positive-valued DC voltage outputs of the third cluster of renewable power generators onto a positive terminal of the third monopole DC collection network; and
a fourth monopole DC collection network for aggregating the negative-valued DC voltage outputs of the fourth cluster of renewable power generators onto a negative terminal of the fourth monopole DC collection network,
wherein the first bipole transmission system is coupled to the positive and negative terminals of the third and fourth monopole DC collection networks.

18. The renewable power generation system of claim 12, wherein positive-valued DC output terminals of the renewable power generators included in the first cluster are connected in parallel to the positive terminal of the first monopole DC collection network, and wherein negative-valued DC output terminals of the renewable power generators included in the second cluster are connected in parallel to the negative terminal of the first monopole DC collection network.

19. The renewable power generation system of claim 12, wherein the first bipole transmission system is coupled to the positive terminal of the first monopole DC collection network and to the negative terminal of the second monopole DC collection network without using a power converter.

20. The renewable power generation system of claim 12, wherein the first bipole transmission system transfers the aggregated power to the power grid substation at substantially the same voltage as the first and second monopole DC collection networks.

21. A method of transferring power generated by a renewable power generation system to a power grid, the method comprising:
configuring a first cluster of renewable power generators to provide an aggregated positive-valued DC voltage output;
configuring a second cluster of renewable power generators to provide an aggregated negative-valued DC voltage output;
connecting, via a positive pole transmission cable of a bipole transmission system of a DC connection system, the aggregated positive-valued DC voltage output of the first cluster of renewable power generators to a first power converter of a power grid substation via a first monopole DC collection network and the bipole transmission system of the DC connection system; and connecting, via a negative pole transmission cable of a bipole transmission system of a DC connection system, the aggregated negative-value DC voltage output of the second cluster of renewable power generators to a second power converter of the power grid substation via a second monopole DC collection network and the bipole transmission system of the DC connection system.

22. The method of claim 21, further comprising:
connecting neutral terminals of the first and second clusters of renewable power generators to the first and second power converters of the power grid substation via a neutral cable of the bipole transmission system, and wherein the first power converter is independent of the second power converter.

23. The method of claim 22, further comprising:
permitting power transfer from the first cluster of renewable power generators to the power grid via the positive pole transmission cable of the bipole transmission system even though power is not flowing from the second cluster of renewable power generators to the power grid via the negative pole transmission cable of the bipole transmission system; and
permitting power transfer from the second cluster of renewable power generators to the power grid via the negative pole transmission cable even though power is not flowing from the first cluster of renewable power generators to the power grid via the positive pole transmission cable.

24. The method of claim 22, further comprising:
forcing the cluster of renewable power generators that is generating the most power to reduce its power output so that an amount of current flowing through a grounded connection of the bipole transmission system is limited during an outage of the neutral cable.

* * * * *